April 6, 1965      G. A. HANNAY      3,176,931
STATIC GROUNDING REELS
Filed Feb. 2, 1962      2 Sheets-Sheet 1
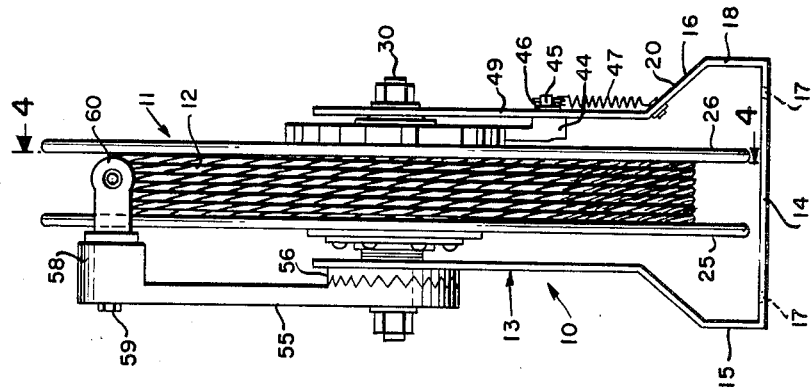
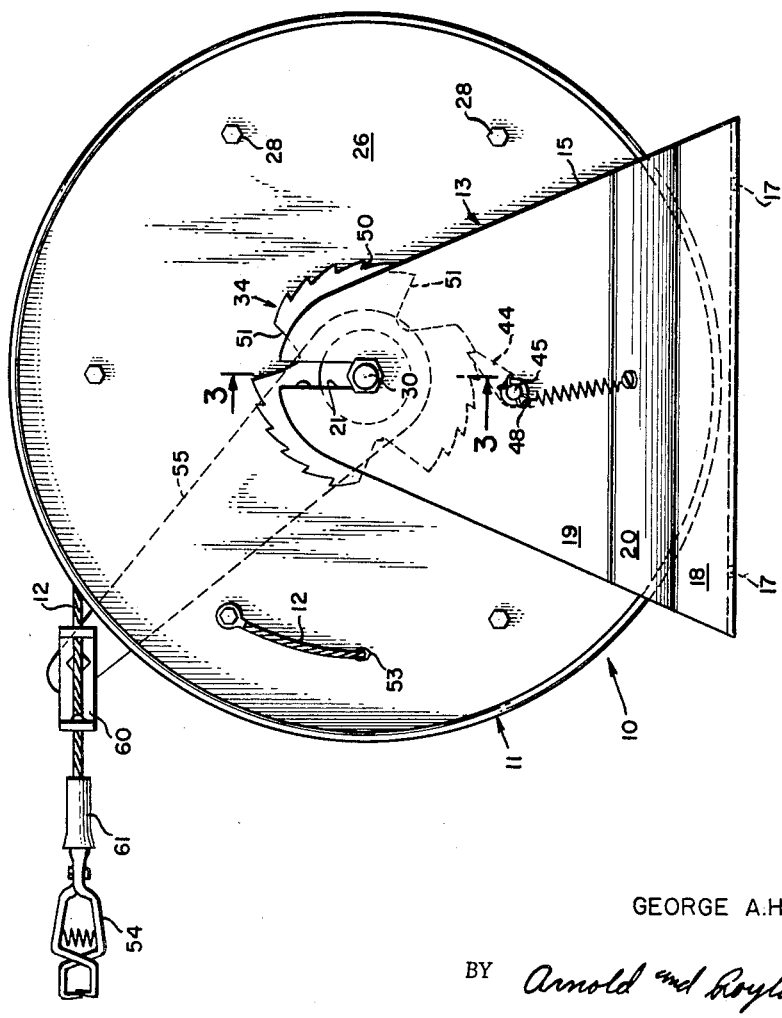
INVENTOR
GEORGE A. HANNAY
BY *Arnold and Roylance*
ATTORNEYS

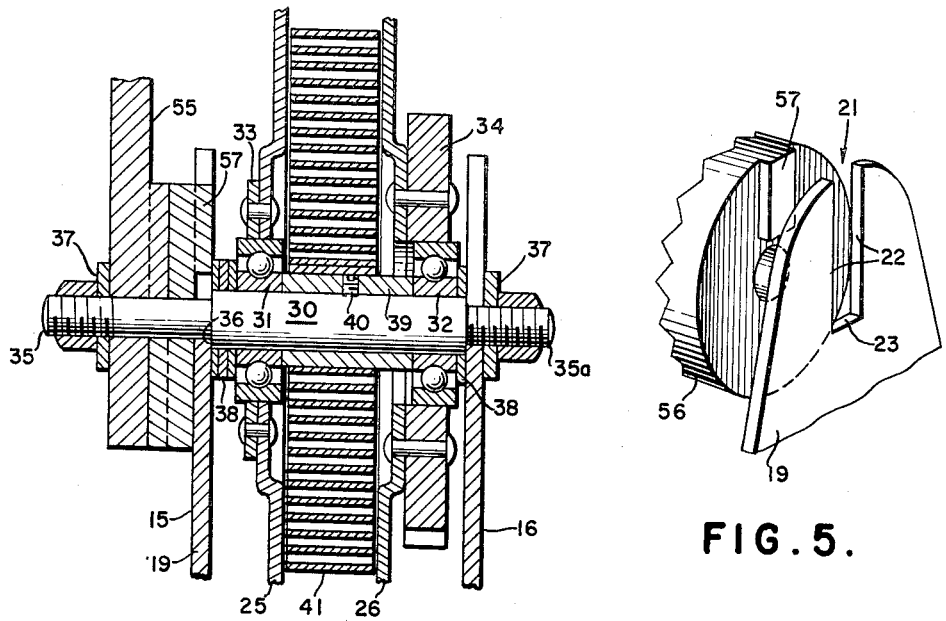
FIG. 3.
FIG. 5.
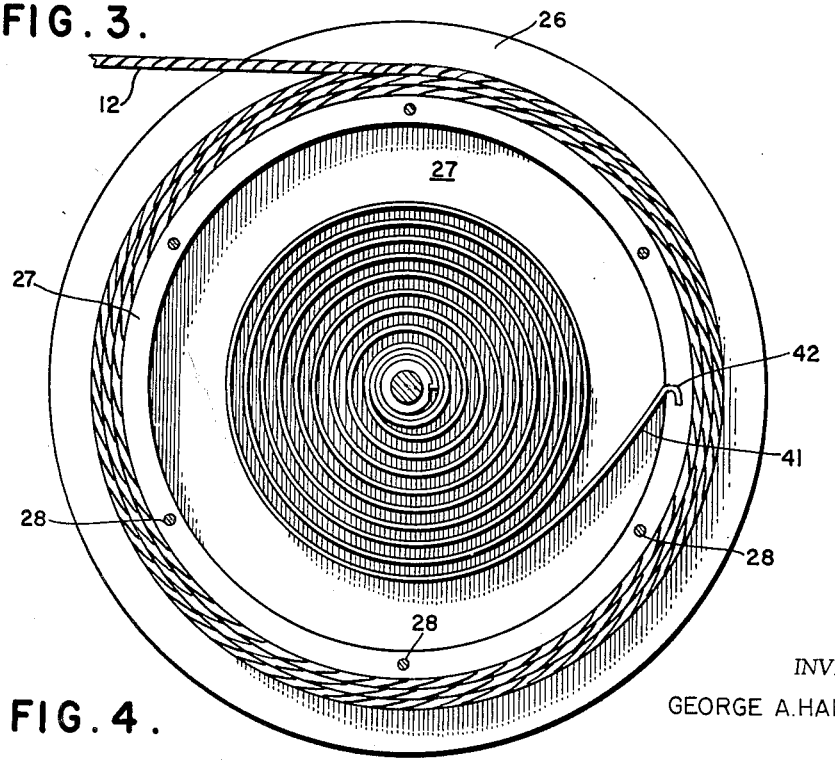
FIG. 4.
INVENTOR
GEORGE A. HANNAY
BY Arnold and Roylance
ATTORNEYS

United States Patent Office 3,176,931
Patented Apr. 6, 1965

3,176,931
STATIC GROUNDING REELS
George A. Hannay, Westerlo, N.Y., assignor to Clifford B. Hannay & Son, Inc., Westerlo, N.Y., a corporation of New York
Filed Feb. 2, 1962, Ser. No. 170,661
3 Claims. (Cl. 242—107.7)

This invention relates to reels and more particularly to static grounding reels.

A static grounding reel is a reel adapted to store a conductive cable which can be grounded and connected to an object so that any charge of static electricity which would otherwise build up on the object passes to ground through the cable and reel.

While not limited thereto, the invention is particularly applicable to static grounding reels of the type used during the refueling of aircraft to electrically ground the aircraft and prevent any sparking or electrical discharge due to the buildup of static electricity as a result of fuel flowing into the aircraft. This type of reel is normally mounted on either a fuel truck or a fueling stand in close proximity to other equipment. At the beginning of the refueling procedure, the cable is unwound from the reel and connected to a conductive portion of the aircraft. At the end of the refueling procedure, the cable is disconnected from the aircraft and is rewound upon the reel.

Accordingly, one of the objects of this invention is to provide an improved heavy duty reel which is simple in construction and easy to operate.

Another object is to provide a reel which is not only of rugged construction for heavy duty usage but is relatively thin so that it can be mounted in close proximity to other equipment and occupy a relatively small space.

Still another object is to provide a static grounding reel particularly useful during the refueling of an aircraft.

A further object is to provide a reel of the type described with means for rewinding the cable.

Another object is to provide a reel with improved means for guiding the cable.

In order that the manner in which these and other objects are attained in accordance with the invention can be understood in detail, reference is had to the accompanying drawings, which form a part of this specification, and wherein:

FIGS. 1 and 2 are an end elevational view, respectively, of one embodiment of the invention;

FIGS. 3 and 4 are a longitudinal sectional view and a vertical sectional view, respectively, along lines 3—3 of FIG. 1 and 4—4 of FIG. 2; and FIG. 5 is an exploded perspective view of a detail, FIGS. 3 and 5 being on enlarged scales relative to those of the other figures for clarity of illustration.

Referring now to the drawings, there is shown a static grounding reel 10 comprising a drum 11 for storing a cable 12, the drum being supported on a frame 13.

Frame 13 is of heavy gauge sheet steel and comprises a flat base 14 and a pair of upwardly extending arms 15 and 16. Base 14 is rectangular and has a plurality of holes 17 spaced so that the frame can be mounted rigidly by bolts, studs and the like upon a support structure such as a fueling truck or a fueling stand. Base 14 is relatively broad to provide the necessary support for rigidly supporting the drum.

Arms 15 and 16 are bilaterally symmetrical about a vertical plane passing through the longitudinal center line of base 14. Each of arms 15 and 16 is generally triangular and extends upwardly from a different one of the long sides of base 14. Furthermore, each arm includes a flat, lower vertical portion 18, a flat, upper vertical portion 19 and a flat, inclined portion 20 extending between portion 18 and portion 19. Portions 18 and 20 are trapezoidal, whereas portion 19 is generally triangular. The upper edge of portion 19 is rounded and has a vertical slot 21 provided with parallel side walls 22 and a horizontal bottom wall 23. Portions 18 are parallel and portions 19 are parallel, but portions 19 are spaced a distance less than the spacing of portions 18. The spacing of portions 18 is sufficiently great to enable a tool such as a wrench to be used to mount the frame. Portions 19 are also spaced above base 14 a distance which is sufficiently great so that the lower edge of drum 11 is closely adjacent to but does not touch base 14, such distance corresponding roughly to the radius of the drum.

Drum 11 comprises a pair of flat, parallel, vertical, annular flanges 25 and 26 disposed on opposite sides of a ring 27 and secured thereto by a plurality of evenly spaced bolts 28 which extend through aligned holes in the flanges and the ring. The outer and inner diameters of each flange are greater and lesser than the corresponding diameters of ring 27 so that each flange extends a substantial radial distance outwardly and inwardly of the ring. The outer edges of the flanges are rolled both to protect the cable and to strengthen the flanges.

Cable 12 is of electrically conductive material such as 1/8" diameter 7/19 steel cable and has a length great enough to allow the cable to be connected to the object being grounded. Cable 12 is wound about the outer periphery of ring 27, the coils being retained on the ring by those portions of flanges 25 and 26 which extend outwardly beyond the ring.

Drum 11 is supported on frame 13 by a shaft 30, a pair of ball bearings 31 and 32, a bearing support plate 33, and a ratchet wheel 34. Shaft 30 has a pair of externally threaded end portions 35 and 35a which extend through slots 21, the diameter of each end portion being slightly less than the width of the adjacent slot. The middle portion of shaft 30 is of greater diameter than the end portions to provide a pair of transverse, oppositely facing shoulders 36 which abut the adjacent inner surfaces of portions 19, shoulders 36 being spaced the same as portions 19.

Bearing support plate 33 is annular and is riveted to flange 25 so that it extends transversely of the shaft. The outer race of ball bearing 31 is press fitted into and supports plate 33, whereas the inner race of ball bearing 31 is mounted on shaft 30. Similarly, ratchet wheel 34 is riveted to flange 26 and is connected to the outer race of ball bearing 32 which has its inner race mounted on shaft 30 so that drum 11 is rotatable about the axis of shaft 30.

The end portions of shaft 30 rest on the bottom walls 23 of slots 21. Shaft 30 is held stationary by a pair of nut and lock washer combinations 37. A plurality of washers 38 are mounted on shaft 30 between arms 15 and 16 and the ball bearings.

An arbor 39 is mounted on the middle portion of shaft 30 and is secured thereto by a set screw 40, the arbor anchoring one end of a spiral torsion spring 41 having its other end anchored in a slot 42 in the inner periphery of ring 27. Arbor 39 and the inner end of spring 41 are shaped so that the spring is automatically released to prevent damage in the event of reverse winding. Spring 41 biases drum 11 in the winding direction, that is, the direction in which rotation of the drum causes cable 12 to be rewound thereon. Spring 41 has a sufficient number of turns to enable all of the cable stored on the reel to be unwound without fully winding the spring. Furthermore, spring 41 is housed in drum 11 between the ring and those portions of flanges 25 and 26 which extend inwardly of the ring.

Ratchet wheel 34 is also a part of a pawl and ratchet mechanism which includes a pawl 44 rotatably supported by a shaft 45 that extends through a lug 46 in portion 19 of arm 16, the shaft being directly below shaft 30. A helical tension spring 47 has one end secured to portion 20 of arm 16 directly beneath shaft 45 and has its other end connected to the eyelet of a cotter pin 48 that extends through the outer end of shaft 45. Spring 47 biases pin 48 towards a vertical position. Pawl 44 is mounted on the inner end of shaft 45 so that when pin 48 is vertical, pawl 44 is vertical. Consequently, spring 47 biases pawl 44 towards a vertical position.

Ratchet wheel 34 has a plurality of teeth 50 and a plurality of evenly spaced recesses 51. The recesses are arranged so that when each recess is directly above pawl 44, the pawl assumes a vertical position and extends into the recess.

Pawl 44 is movable from its vertical position to either a locking position or a releasing position dependent on the direction of rotation of the drum. In its locking position, pawl 44 allows the cable to be unwound, but upon release of the cable, pawl 44 engages teeth 50, as shown in FIG. 1, and locks the drum against rotation in the winding direction. In its release position, pawl 44 allows the drum to rotate in the winding direction.

The inner end of cable 12 extends through an aperture 53 in flange 26 and is secured to one of bolts 28. The outer end of cable 12 is secured to an alligator clamp 54 by means of which the cable can be electrically connected to an aircraft.

Reel 10 also comprises a cable guide having an adjustable support arm 55 mounted at one end on end 35 of shaft 30, which is longer than end 35a. Arm 55 has a plurality of axially facing teeth engageable with similarly shaped teeth of a lock ring 56 mounted on shaft 30 between arms 55 and 15. Lock ring 56 has a rectangular projection 57 which is of the same width as and extends into the adjacent one of slots 21. Since the face of ring 56 which abuts arm 15 is flat, projection 57 prevents rotation of the ring and of arm 55 which meshed therewith. The arm can be adjusted upon loosening and tightening the nut and lock washer combination 37 adjacent thereto.

Arm 55 extends radially outwardly of shaft 30 alongside of drum 11 and has at its outer end a lug 58 that supports a bolt 59 upon which is swivelled a U-shaped guide 60 having a pair of aligned, wear-resistant rings through which cable 12 passes. The rings protect the cable, guide the cable and resist wear due to frictional contact with the cable. A protective sleeve 61 of rubber tubing surrounds the outer end of cable 12 and abuts the alligator clamp to protect the clamp from guide 60.

Guide 60 is positioned in the plane of rotation of drum 11 and allows the cable to be pulled in directions other than directly tangential to drum 11, the pivotal movement of the guide being in the plane of rotation of drum 11 and about an axis parallel to the axis of rotation of drum 11.

Except for the tip portion of one end of shaft 30, the parts of reel 10 are located between the planes in which portions 18 lie so that the reel is thin and compact in an axial direction. Furthermore, with the exception of sleeve 61, all parts are of metal to provide a rugged reel and a conductive path from the cable through the reel to ground.

In operation, when it is desired to unwind the cable, cable 12 is pulled and rotates drum 11 against the bias of spring 41. When the desired amount of cable has been unwound, pawl 44 is locked with ratchet wheel 34 to allow release of the tension on the cable.

Then, when it is desired to wind the cable, cable 12 is pulled to rotate the drum until pawl 44 moves into one of recesses 51, whereupon the cable can be released to allow the spring to rewind the cable on the drum.

While only one embodiment has been disclosed, it will be apparent that many changes can be made in the details and arrangements of parts without departing from the scope of the invention as defined in the appended claims.

What is claimed is:
1. A static grounding reel assembly for a ground cable, comprising
a frame comprising
  a base adapted to be mounted on a suport structure, and
  a pair of symmetrical arms extending upwardly from said base on opposite sides thereof,
  said arms including parallel lower portions, parallel upper portions and inclined portions extending between said lower and said upper portions,
  said upper portions being spaced a distance less than the spacing of said lower portion;
a stationary shaft mounted on said frame and including
  a medial portion abutting said upper portions, and
  a pair of externally threaded end portions of reduced diameter supported on and extending through said upper portions;
a drum rotatable about the axis of said shaft, said drum comprising
  a ring, and
  a pair of annular flanges secured on opposite sides of said ring and extending radially inwardly and outwardly of said ring, whereby the cable is adapted to be wound on said ring and retained thereon by said flanges;
a pair of ball bearings supported on said medial portion of said shaft;
a bearing support plate secured to one of said flanges and to one of said ball bearings;
a ratchet wheel secured to the other of said flanges and to the other of said ball bearings, whereby said drum is supported on said frame via said shaft, said ball bearings, said bearing support plate and said ratchet wheel;
a spiral torsion spring enclosed in said drum between said flanges and having one end anchored on said ring and its other end anchored by said shaft, said spring biasing said drum in a winding direction;
a pawl releasably engageable with said ratchet wheel for locking said drum against rotation due to the bias of said spring;
a guide adapted to guide the cable;
an adjustable guide support arm mounted on one end of said shaft and supporting said guide at its outer end; and
a lock ring having axially projecting teeth engageable with said guide support arm and including a flat face abutting said upper portion of one of said arms of said frame,
  said lock ring including a projection engageable with said arm of said frame to prevent rotation of said lock ring and said guide support arm from its adjusted position.
2. A static grounding reel in accordance with claim 1 wherein
said one arm of said frame includes a vertical slot, and
said projection extends into said slot and is engaged with the walls thereof.
3. A static grounding reel assembly for storing a grounding cable, comprising
a rigid frame of heavy gauge sheet material comprising
  a flat rectangular base adapted to be mounted on a support structure for said reel, and
  a pair of arms extending upwardly from opposite sides of said base and having parallel upper portions spaced apart a distance less than the distance between said opposite sides of said base;
a stationary shaft mounted on said frame and extending between said upper portions parallel to said base, said shaft including an end portion which extends beyond one of said upper portions;

a drum mounted for rotation between said arms about the axis of said shaft, said drum being adapted to store the grounding cable whereby the cable can be unwound and wound on said drum;

an adjustable guide support arm mounted on said end portion of said shaft and extending radially outwardly therefrom a distance greater than the radius of said drum;

a guide supported on said guide support arm and adapted to guide the cable as it is unwound and rewound;

a spring enclosed in said drum between said flanges and connected to said shaft for biasing said drum in a winding direction;

means for releasably locking said drum against rotation in a winding direction, whereby a predetermined length of the cable can be unwound and rewound;

a locking ring operative to prevent movement of said support arm from its adjusted position, said locking ring being disposed on said shaft between one of said pair of arms and said adjustable guide support arm;

said ring having means projecting from one face thereof engageable with said one of said pair of arms to prevent rotation of said ring relative to said arm, and said ring having means projecting from the other face thereof engageable with said guide support arm to prevent angular movement of said guide support arm; and means for clamping said ring between said guide support arm and said one of said pair of arms.

References Cited by the Examiner

UNITED STATES PATENTS

| | | | |
|---|---|---|---|
| 654,138 | 7/00 | Dennett | 317—2 |
| 800,049 | 9/05 | Ayres | 242—107.1 |
| 870,908 | 11/07 | Sholes | 242—107.4 |
| 906,045 | 12/08 | Martin | 242—107.13 X |
| 962,099 | 6/10 | Reinhart et al. | 242—107.4 |
| 1,086,946 | 2/14 | Smith | 242—55.2 |
| 1,819,434 | 3/31 | Montgomery | 242—55.2 X |
| 1,993,617 | 3/35 | Nason | 242—107.7 X |
| 2,363,677 | 11/44 | Kirk | 242—128 X |
| 2,455,377 | 12/48 | Maggiacomo | 242—86.8 |
| 2,530,773 | 11/50 | Johnson et al. | 242—107.7 |
| 2,563,045 | 8/51 | Kelly | 242—104 |
| 2,563,714 | 8/51 | Foster | 242—107.7 |
| 2,565,452 | 8/51 | Johnson et al. | 242—107.7 |
| 2,698,146 | 12/54 | Becker | 242—107.7 |
| 2,933,262 | 4/60 | Fish | 242—86.1 |
| 2,969,932 | 1/61 | Becker | 242—107.7 |
| 3,075,724 | 1/63 | Stahmer | 242—107 |

FOREIGN PATENTS

| | | |
|---|---|---|
| 601,482 | 5/48 | Great Britain. |
| 789,490 | 1/58 | Great Britain. |

MERVIN STEIN, *Primary Examiner.*

SAMUEL BERSTEIN, *Examiner.*